United States Patent
Grossman

[11] 3,813,553
[45] May 28, 1974

[54] LASER TRANSCIEVER

[75] Inventor: Sidney J. Grossman, Ocean, N.J.

[73] Assignee: The United States of America as represented by the Secretary of the Army, Washington, D.C.

[22] Filed: May 17, 1973

[21] Appl. No.: 361,384

[52] U.S. Cl............................ 250/347, 250/199
[51] Int. Cl................................. G01t 1/16
[58] Field of Search ........... 250/338, 347, 348, 353, 250/199

[56] References Cited
UNITED STATES PATENTS
3,612,879  10/1971  Ohman ........................... 250/347

Primary Examiner—James W. Lawrence
Assistant Examiner—Davis L. Willis
Attorney, Agent, or Firm—Edward J. Kelly; Herbert Berl; Daniel D. Sharp

[57] ABSTRACT

A laser transceiver device useful in combination with an object to be viewed which object carries a suitably coded transponder, which laser transceiver includes a single objective lens system positioned for both transmission and reception of laser energy, a detector, and a tiltable mirror system for alternatively directing transmitted laser energy onto said objective lens system and said received laser energy onto said detector.

The laser transceiver device can consist of a modified single lens reflex camera having a quick return mirror; the modifications of such a camera include replacing the film by a small solid state laser and by either removing the shutter curtain or restraining it in the fully open position. The camera can be further modified to include a trigger circuit for pulsing the laser and means for operating the trigger circuit in synchronism with operation of the normal camera exposure release mechanism. A decoder corresponding to the coded transponder in the object being viewed can be installed within the camera body and connected between the camera photocell and the camera metering system. If the energy beam received from the transponder is other than a visible light beam, the light-reading photocell normally used in the camera must be replaced by a detector which can respond to the received transponder energy beam 7 Claims, 8 Drawing Figures 3,813,553

LASER TRANSCIEVER

SUMMARY OF THE INVENTION

The invention relates broadly to a portable laser transceiver device useful for interrogating an object carrying a suitably coded transponder, which device includes a small solid state laser mounted on the optic axis of a single objective lens system and at a distance from the objective lens system equal to the focal length of said lens system. The laser is oriented with respect to an object carrying the transponder. The device further includes a tiltable mirror. When the mirror has been tilted away from the optic axis of the objective lens system, a switching means is operated to trigger the laser into pulsed operation. The mirror, when in this tilted position, does not interfere with propagation of the pulsed laser beam through the single objective lens system to the object being viewed. When the laser beam impinges upon a transponder carried by the object being viewed, a coded beam of electromagnetic radiation - which may be a laser beam - is transmitted from this transponder after a brief delay; this coded beam is directed back along substantially the same path traversed by the incident laser beam from the laser. The amount of the delay need only be sufficient to allow the mirror to return to the rest position. The received beam of energy from the object transponder, after passing through the objective lens system, is reflected from the mirror onto a detector within the device. A decoder, with suitable power supply, also is mounted within the device and is connected in the output circuit of the detector. The decoder will respond to the detected coded electrical output from the detector in such a manner as to provide an electrical output only when the coded detector output corresponds with the coded beam transmitted from the transponder in the object being viewed. The output of the decoder can be connected to an indicating system within the device.

The laser transceiver can be built into an ordinary single lens reflex camera which is modified by replacing the film normally used with a small solid state laser mounted on the optic axis of the camera objective lens system and at a distance from the objective lens system equal to the focal length of said lens system; in some instances, the camera shutter can be removed. The scene is viewed, that is, the laser is oriented with respect to an object carrying the transponder by means including the camera objective lens system, tiltable mirror, and viewfinder assembly (including the usual prism and eyepiece). The mirror, when in the rest position, reflects light received from the object carrying the transponder by way of the objective lens system onto the camera viewfinder assembly. When the camera exposure release is enabled, the mirror is tilted in the usual manner away from the optic axis of the objective lens system and the camera either is modified to contain switching means operating in synchronism with said enabling switch to simultaneously trigger the laser into pulsed operation, or the flash lamp circuit built into the camera can be energized to pulse the laser into operation. The pulsed laser beam is not impeded by the mirror when the latter is in the tilted position, and the pulsed laser beam passes through the camera objective lens system to the object being viewed. When the laser beam impinges upon the transponder carried by the object being viewed, the coded beam of electromagnetic radiation emanating from this transponder is delayed by an amount sufficient to allow the camer to return to the normal manner to the rest position (usually a period of the order of 1/40 second) and, after passing through the camera objective lens system, is reflected from the mirror onto the detector. If the transponder is transmitting a coded laser beam, the detector could be an infrared-responsive photocell replacing the light-reading photocell normally used in the camera. The decoder is mounted within the camera body, for example, in the region normally occupied by one of the film spools, and is connected in the output circuit of the detector. The output of the decoder, if any, is connected to the camera metering system, which system includes a movable pointer visible through the camera viewfinder assembly. It follows that camera meter movement will occur only when the object being viewed is one carrying a transponder whose code corresponds with the decoder built into the camera housing.

DESCRIPTION OF THE PREFERRED EMBODIMENT

Figure 1:
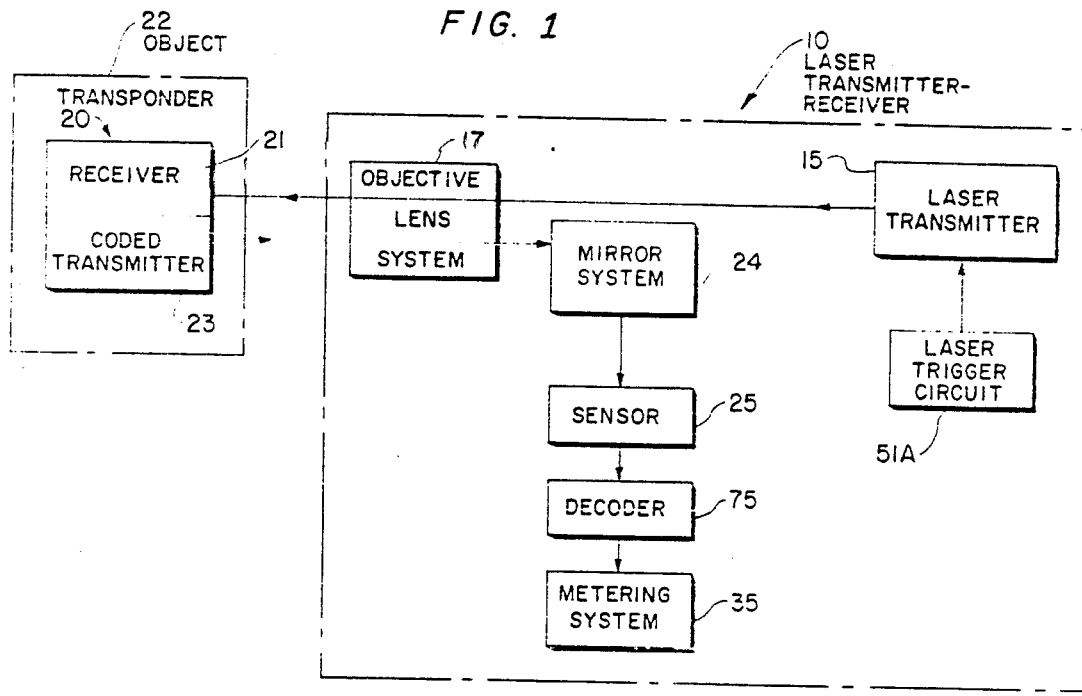
FIG. 1 is a simplified block diagram illustrating a laser receiver-transmitter using a single objective lens system for both transmission to and reception from an object carrying a transponder, made possible by a mirror system which properly directs the optical paths within the laser receiver-transmitter.

Referring to the drawings, the basic system of the invention is illustrated in FIG. 1. All elements of the laser transmitter-receiver 10 may be mounted on or within a modified single lens reflex camera body, and the same reference numeral 10 is used to denote the camera body itself; these elements include a small laser transmitter 15 which is disposed along the optic axis of the camera objective 17 in the plane normally occupied by the camera film. The laser 15 is pulsed at an appropriate time, governed by the operation of the camera mirror and shutter mechanisms, and the transmitted laser beam after passing through the camera objective 17, impinges upon the receiver portion 21 of the transponder 20 carried by the object or target 22 toward which the camera is visually aimed. The transponder 20 includes a specially coded transmitter 23, which, in response to said received laser beam from the laser transmitter-receiver 10, propagates a coded beam which enters the camera along the optic axis of the objective lens system 17. The received coded beam then is focused and directed through some form of beam splitting camera optics 24 onto a suitable radiation sensor or detector 25. The detected coded laser radiation then is applied to a decoder 75 which is designed, in the well known manner, to provide an output only when the detected beam from the transponder 20 has the proper code associated therewith. The decoded output, if any, then causes the metering system 35 of the camera to be actuated. The camera body 10, in addition to containing therein the objective lens system 17, sensor 25, and metering system 35, already referred to in connection with FIG. 1, also contains a tiltable mirror 40, a viewing assembly 45 including a ground glass screen 46, a field condenser lens 47, prism 48 and eyepiece 49, a sensor power supply 50, a photoflash circuit 51, and a shutter curtain 55. Extending from the camera body 10 is a focus control dial 61 for adjusting the focal length of the objective lens system 17 and a cocking lever 62 for cocking the shutter mechanism and setting the spring which holds the mirror in the rest position, i.e., at an angle of 45° to the optic axis of the objective lens system 17. The photoflash circuit 51 responds to actuation of the shutter mechanism to provide a signal which is available at terminal plug 52 on the camera body. The camera also includes a release button 64, which, in addition to moving the mirror 40 away from the optic axis of the objective lens system 17, causes actuation of the shutter mechanism. The exposure time dial 65 includes a setting for flash photography for actuation of photoflash circuit 51. With the exception of the sensor 25 and the shutter curtain 55, all of the foregoing elements of the camera can be retained intact. The light-sensitive photocell normally found in the SLR camera must be replaced by one sensitive to the laser radiation from the object 22 being examined. This modification is a relatively minor one, however, and the small sensor, which normally is an infrared sensitive detector, can, if desired, be mounted in the same position within the camera body as the light-sensitive photocell normally used. The sensor power supply 50 can be a small battery inserted into a closable aperture in the camera body, in a well known manner.

The shutter curtain 55 must be restrained in the fully open position or removed as its closure may interfere with proper operation of the transmitter.

Figure 2:
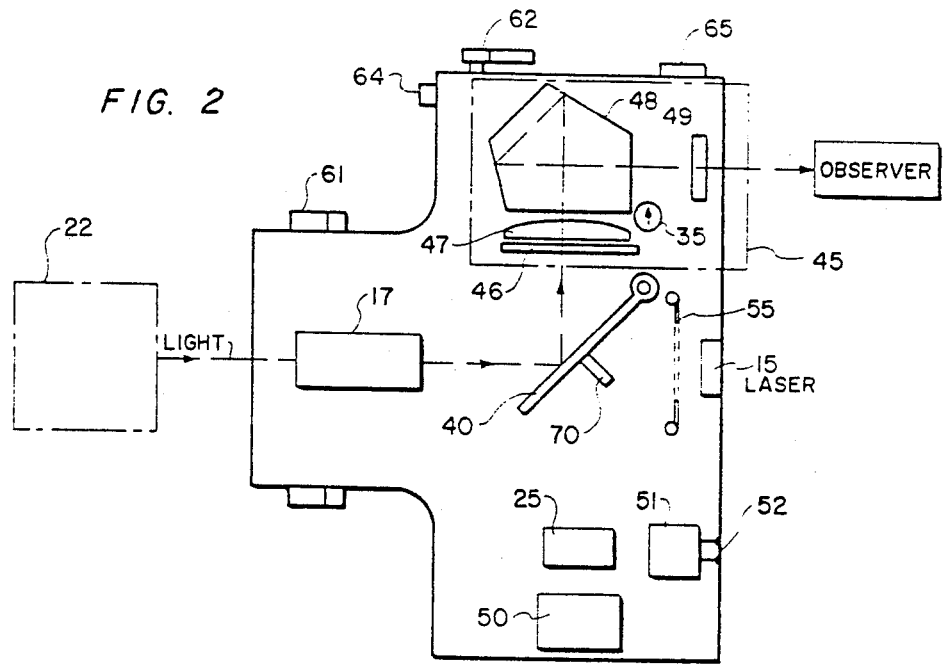
FIGS. 2–4 are schematic vertical section views illustrating basic components of a modified SLR camera used as a laser receiver-transmitter in the system of FIG. 1, each view illustrating a different cycle of operation.
Figure 3:
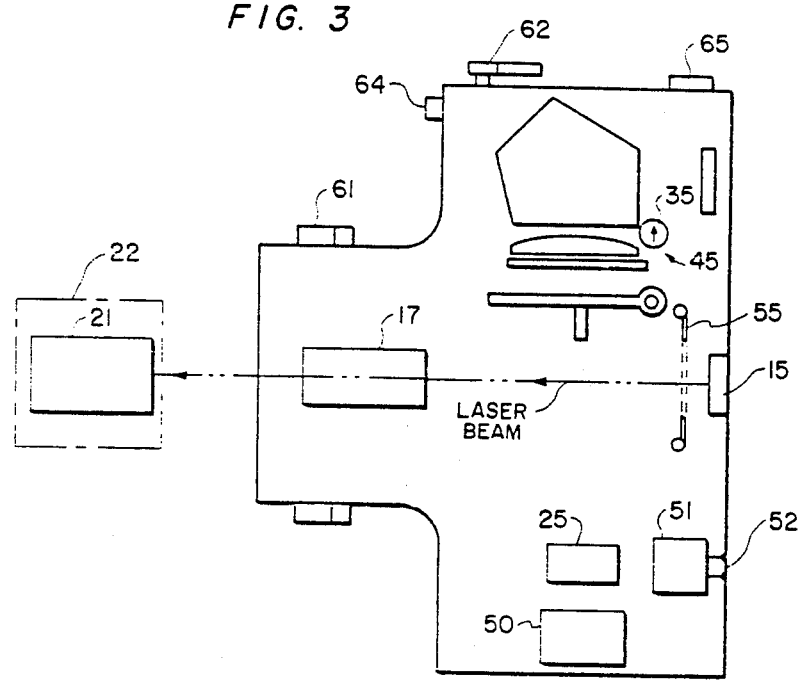
Figure 4:
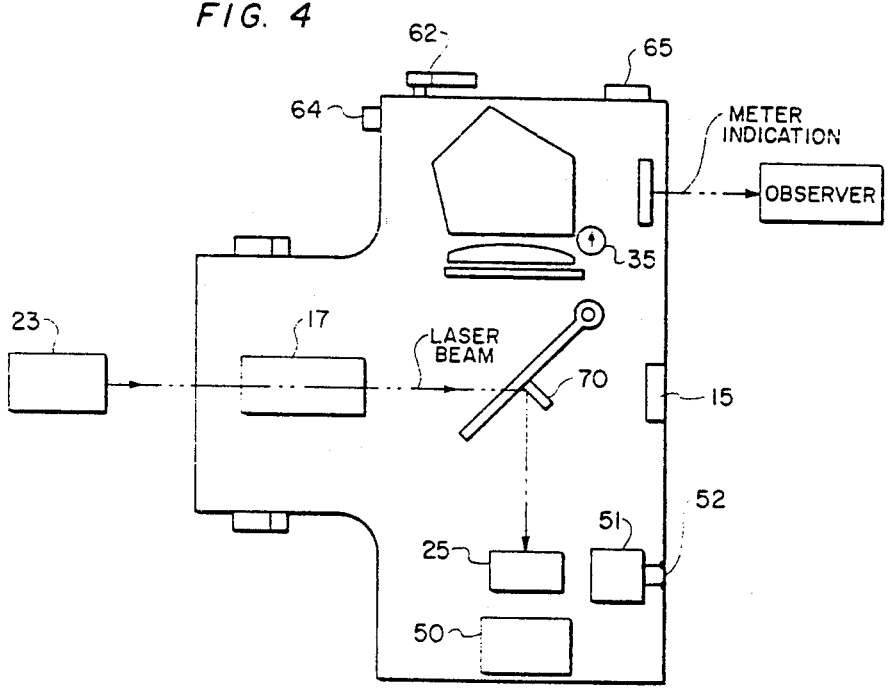

Referring now to FIGS. 2–4, the sequence of operation of the system of the invention will be demonstrated. As shown first in FIG. 2, the camera is aimed by the observer at the object 22 and light from the object 22 being observed passes through the camera objective lens system 17; an image of the object is focused thereby onto the ground glass screen 46 of the camera viewing assembly 45 by way of the mirror 40. The mirror 40, when in the position shown in FIG. 2, viz., at an angle of 45 degrees with the optic axis of the objective lens system 17, is referred to as being in the rest position. The light rays, indicated in FIG. 2 by the dashed line, pass through the viewing assembly 45, including the prism 48 and eyepiece 49 to the eye of the observer. The image of the object is properly focused on the ground glass screen 46 of the camera by means of the well known focus control 61 of the camera, which makes the appropriate adjustments in the objective lens system 17. The viewing assembly 45 further includes a microprism, or other optics, not shown, which provide within a small central region of the ground glass screen some form of indication that proper focusing has been achieved. It will be noted that the sensor 25 is not needed during this portion of the operating cycle shown in FIG. 2. The lens aperture control of the camera is left wide open in the system of the invention and there is no need for accurate meter settings at this point.

Now that the object 22 has been properly aligned and focused, the operation shown in FIG. 3 occurs. The shutter is cocked by setting the cocking mechanism 62, if it has not already been cocked. The release button 64 then is depressed and two major functions are performed. Firstly, the tiltable mirror 40 is released from its rest position of FIG. 1 and tilts upwardly to a position shown in FIG. 3. In this position, referred to as the tilted position, the mirror blocks passage of light or other radiation received by the camera from entering the viewing assembly 45. Secondly, with the exposure dial 65 set for flash operation, the photoflash circuit 51 is actuated and a signal is provided to cause the laser trigger circuit 51 to actuate a small laser 15, such as a gallium arsenide laser. The laser 15 may be attached to a mounting screw which can be screwed into the back plate of the camera. The laser 15 is disposed along the optic axis of the objective lens system 17 and in the plane normally occupied by the camera film (referred to here as the film plane). Upon actuation, the laser 15 emission emerges from the objective lens system 17 as a collimated laser beam.

A substantial portion of the collimated laser beam emitted by laser 15 is intercepted by the receiving portion 21 of the transponder 20 located in the object 22. In response to reception of the laser beam transmitted from the laser transmitter-receiver 10, a coded laser beam is transmitted from the transmitter portion 23 of the transponder 20 in accordance with well known transponder principles. Transmission of this coded beam is delayed at the transponder 20 for a time sufficient to allow the camera mirror 40 to resume its normal rest position (that shown in FIG. 4). This period is of the order of 1/40 second for most SLR cameras having instant (quick return) mirrors.

It should be pointed out here that a few SLR camera require subsequent cocking to release the mirror to the rest position. Such cameras, of course, would be unsuitable for use in the system of the invention. The same is true for SLR cameras having fixed pellicles.

Figure 6:
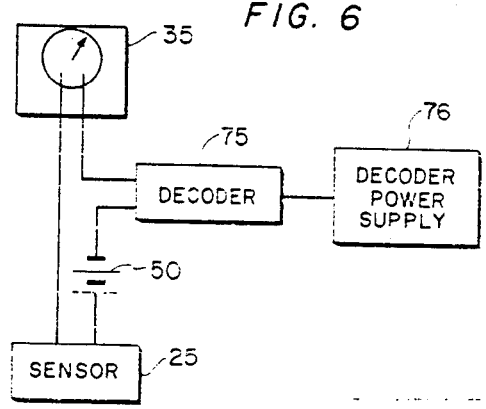
FIG. 6 is a simplified circuit diagram of the receiver electrical circuitry for sensing and monitoring the coded beam from the transponder.

In the operating cycle illustrated in FIG. 4, the coded laser beam from the transponder 20 will pass through the objective lens system 17 and the mirror 40 and will be reflected from the secondary mirror 70 to the sensor 25, as indicated in FIG. 4. Power for the sensor 25 is supplied by the power supply 50, which, as already mentioned, can be a small battery. The coded output of the detector (sensor) 25 then is first decoded by a suitable decoder 75 designed to provide an output only when the coded input thereto is of the proper format. Such decoding circuits are well known in the art and need not be described here. Upon receipt of the proper coded output from the detector 25, the decoder 75 can actuate the metering system 35 of the camera; the metering system includes an indicating needle mounted so that its movement is visible to the observer through the viewing assembly 45. A typical sensing, decoding and indicating system is shown in block diagram of FIG. 6.

Figure 5:
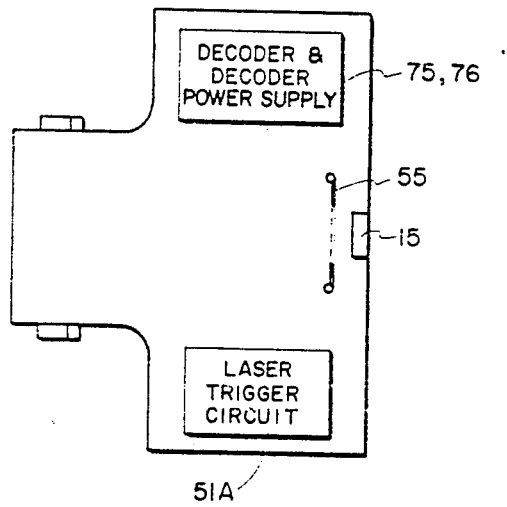
FIG. 5 is a schematic horizontal section view illustrating placement of certain electrical components in the camera of FIGS. 2–4.

As shown in FIG. 5, the decoder 75 and power supply 76 for the decoder can be mounted within the space normally occupied by one of the film cassettes.

Figure 7:
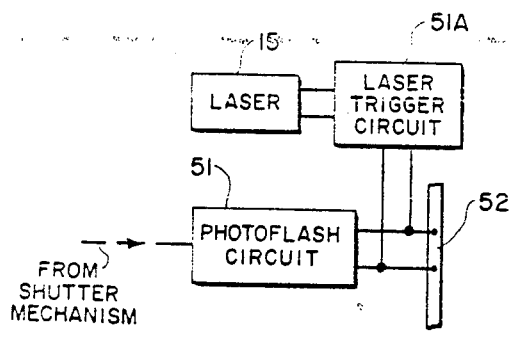
FIGS. 7 and 8 show schematically alternate means for activating the laser transmitter of the modified SLR camera.
Figure 8:
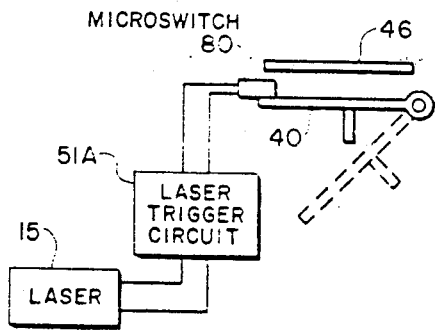

As previously mentioned, the laser trigger circuit 51A may be actuated directly by the photoflash circuit of the camera. This arrangement is shown schematically in FIG. 7. Another means for triggering the laser 15 is shown in FIG. 8 and includes a microswitch 80 mounted near the ground glass screen 46 at one end of the movable path of the mirror 40. The microswitch contacts are closed when the mirror 40 arrives at the tilted position and the laser trigger circuit 51A is actuated. This laser trigger circuit 51A can be any well known type of laser pulsing circuit.

Many modifications and variations of the present invention obviously are possible in the light of the above disclosure. For example, the transponder need not transmit a laser beam. It is possible that the transponder can respond to receipt of the laser beam from the laser transmitter-receiver 10 by sending out a coded beam the frequency of which lies within any portion of the optical or quasi-optical spectrum. It is therefore to be understood, that, within the scope of the appended claims, the invention may be practiced otherwise than as described specifically.

What is claimed is:

1. A laser transmitter-receiver comprising a quick-return tiltable mirror, a single objective lens system, a laser mounted in the focal plane of the objective lens system and along the optical axis thereof, the laser beam from said laser being directed through said lens system toward a target during energization of said laser, an operator-controllable mechanical actuating means for energizing said laser and for tilting said mirror away from the optical axis of said lens system during a predetermined interval less than that required for laser energy to reach a target and return therefrom, a detector, said actuating means including means for returning said mirror to a rest position after said predetermined interval for intercepting said received laser energy and directing said received laser energy onto said detector.

2. In combination, a laser transmitter-receiver comprising a device having a single objective lens system and a quick-return tiltable mirror and capable of being directed by an operator thereof toward an object to be examined, said object carrying a transponder which, upon receipt of laser energy, transmits a coded laser beam after a delay governed by the mirror tilting cycle, said device including a laser mounted in the focal plane of the objective lens system and along the optic axis of the latter, a detector responsive to said coded laser beam, and a decoder in circuit with said detector, said laser being pulsed to generate a laser beam upon completion of tilting of said mirror, which beam after collimation by said objective lens means, propagates in the direction of said object and is intercepted by said transponder, said decoder supplying an input to said detector only in response to the particular form of coded electromagnetic energy emanating from said transponder for identifying said object being examined.

3. In combination, a laser transmitter-receiver comprising a modified single lens reflex camera of the type having a quick-return mirror and capable of being directed by an operator thereof toward an object to be examined, said object carrying a transponder which, upon receipt of laser energy, transmits a coded laser beam after a delay governed by the camera mirror system tilting cycle, said camera being modified to include a laser mounted in the focal plane of the camera objective normally occupied by film and along the optic axis of the camera objective, a detector responsive to said coded laser beam, and a decoder in circuit with said detector, said laser being pulsed to generate a laser beam in response to actuation of the camera flash circuit which beam after collimation by said objective lens means, propagates in the direction of said object and is intercepted by said transponder, said decoder supplying an input to the camera metering system only in response to the particular form of coded electromagnetic energy emanating from said transponder for visually identifying said object being examined.

4. In combination, a modified single lens reflex camera capable of being directed by an operator thereof toward an object to be examined; said camera including therein a tiltable mirror movable between a tilted position and a rest position, an adjustable focus objective lens system, and a metering and viewing system for obtaining a focused light image of suitable intensity of said object when said mirror is in the rest position, a laser mounted in the focal plane of said objective lens system and along the optic axis of the objective lens, a laser triggering source, triggering means synchronized with the mirror tilting mechanism of the camera for pulsing said laser while said camera mirror is in the tilted position such that said mirror blocks passage of energy into said viewing system and is outside the path of the laser beam, said laser generating a pulsed laser beam in response to energy received from said triggering means, said laser beam traversing said objective lens means enroute to said object; said object carrying a transponder including means for intercepting a portion of said laser beam and means for radiating a coded beam of electromagnetic energy subsequent to return of said mirror to the rest position; said camera further including a detector responsive to said received electromagnetic energy from the transponder in said object, and a decoder in circuit with said detector for supplying an electrical input to said metering system only in response to the particular form of coded electromagnetic energy emanating from said transponder.

5. The combination of claim 4 wherein said camera includes a flash lamp energizing circuit which actuates said triggering means.

6. The combination of claim 5 wherein said camera includes a shutter assembly and said mirror tilting mechanism is a portion of a manually operable control means which also is responsible for control of the camera shutter assembly and actuation of said flash lamp energizing circuit.

7. The combination of claim 6 wherein said coded beam is a laser beam and said detector is responsive to infrared radiation.

* * * * *